UNITED STATES PATENT OFFICE.

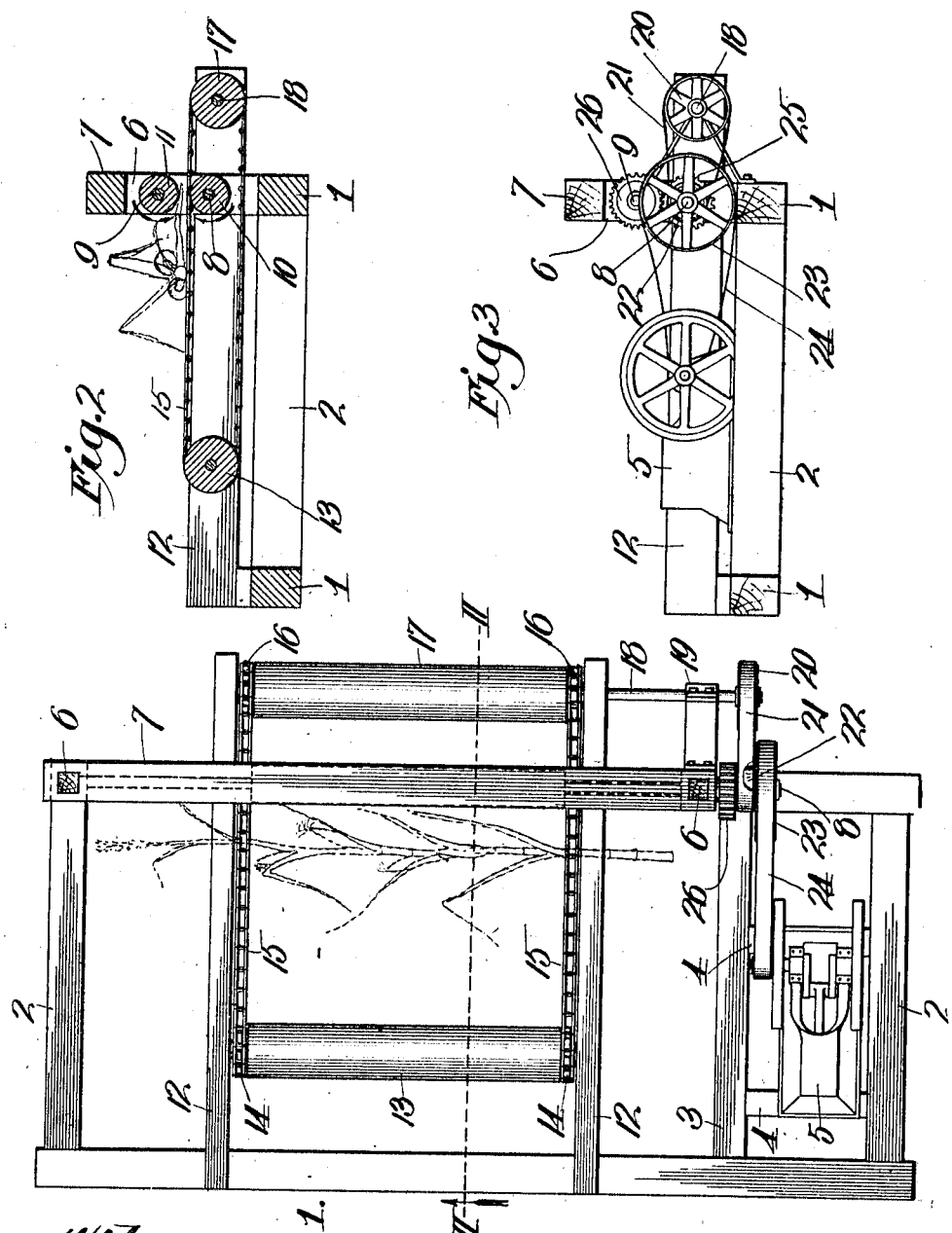

JOSEPH F. MAST, OF HARPER, KANSAS.

MACHINE FOR SNAPPING AND HUSKING EARS OF CORN.

1,021,321.  Specification of Letters Patent.  Patented Mar. 26, 1912.

Application filed October 3, 1910. Serial No. 585,136.

*To all whom it may concern:*

Be it known that I, JOSEPH F. MAST, a citizen of the United States, residing at Harper, in the county of Harper and State of Kansas, have invented certain new and useful Improvements in Machines for Snapping and Husking Ears of Corn, of which the following is a specification.

This invention relates to corn huskers and more especially to a machine arranged to deliver the ears of corn into a wagon while the same is stationary, the corn stalks from a shock being placed by hand in the machine and carried thereby laterally between the snapping and husking rolls thereof, my object being to produce a machine of this character for efficiently and expeditiously snapping the ears from the stalks and husking such ears after the stalks have been cut.

With this general object in view the invention consists in certain novel and peculiar features of construction and organization as hereinafter described and claimed; and in order that it may be fully understood reference is to be had to the accompanying drawing, in which—

Figure 1, is a plan view of a machine embodying my invention. Fig. 2, is a vertical section on the line II—II of Fig. 1. Fig. 3, is an end view of the same.

In the said drawing, a rectangular frame adapted to be secured upon a wagon box in any suitable manner, is preferably composed of parallel side bars 1 and end bars 2. Near its front end it is preferably provided with a cross bar 3 connected by short bars 4 with the front end of bar 2, to form a bed or platform for the motor 5, such as a gas engine, as shown. Near the front end of one of the bars 1, and at the rear end of said bar are uprights 6 connected by a longitudinally-extending bridge bar 7, and between said bar 1, and bridge bar 7 is a longitudinally-extending shaft 8, journaled in standards 6, and a longitudinally extending shaft 9 also bearing a journaled relation to said standards, shaft 9 being disposed vertically above and parallel with shaft 8, and mounted upon said shafts 8 and 9 respectively, are relatively short rolls 10 and 11, these rolls being for the purpose of snapping the corn from the stalks as the latter successively pass between the rolls, in a manner hereinafter explained. At opposite ends of the roll 10, the frame is provided with a pair of parallel cross bars 12, these cross bars incidentally forming a journal for shaft 8 and projecting beyond the adjacent side of the frame, and journaled in bars 12 is a roller 13, equipped at its ends with sprocket wheels 14, connected by parallel sprocket chains 15, with sprocket wheels 16 secured at the ends of a roller 17 at the opposite side of roll 10 from roller 13, the arrangement being such that the upper runs of the chain 15 shall be disposed adjacent to the opposite ends and in about the plane of the top of roll 10, the lower runs of the chains below the plane of said roll as shown clearly in Fig. 2.

The shaft 18 of roller 17 projects forward beyond the front cross bar 2, and is journaled in a bearing bracket 19 projecting from the front standard 6, and at its front end said shaft is equipped with a belt wheel 20 connected by a belt 21 with the belt wheel 22 on the front end of the shaft 8, said shaft also carrying a belt wheel 23 connected by a belt 24 with the engine 5, so that the operation of the latter shall impart rotation to shaft 8 and its roll 10, and also to the endless conveyer constituted by rollers 13 and 17 and chains 15. Shaft 8 is also equipped with a gear wheel 25 meshing with a similar gear wheel 26 on the front end of the shaft 9, of roll 11, so that said roll shall be driven by roll 10.

In operation the corn stalks are placed successively upon the endless conveyer, being arranged longitudinally thereon, as indicated in dotted lines Fig. 1 so that the conveyer, which travels in the direction indicated by the arrow, Fig. 2, shall carry each stalk between the rolls 10 and 11 which are driven in the direction indicated by the adjacent arrows Fig. 2, to coöperate together in squeezing the stalk between them and thereby snapping the ears of corn from the stalk and incidentally expelling the corn from the husks, the said rolls 10 and 11 being disposed sufficiently close together to prevent the ears from passing between them so that the same shall drop down into the bed of the wagon, the stalks passing on between said rolls and off roller 17 onto the ground or into a suitable receptacle placed to receive them. By thus feeding the stalks to the rolls in a position parallel with the same, practically all of the ears can be snapped off and husked simultaneously and therefore more expeditiously and economically than is possible where the stalks are fed endwise to the husking rolls.

From the above description it will be apparent that I have produced a machine possessing the features of advantage enumerated as desirable and I wish it to be understood that I reserve the right to make all changes properly falling within the spirit and scope of the appended claim.

Having thus described the invention what I claim as new and desire to secure by Letters Patent, is:—

A machine for snapping and husking ears of corn, consisting of a suitable frame, uprights thereon, a bridge bar connecting the uprights vertically over one side of said frame, a pair of snapping and husking rolls journaled one above the other in said uprights between the bridge bar and said frame, a pair of bars secured upon the said frame and projecting beyond the side thereof over which the bridge bar is disposed, an endless open conveyer arranged between the frame and bridge bar and the said bars, with its upper strand or run between the snapping rolls and extending longitudinally beyond the same, means for operating the conveyer, means for imparting movement from the conveyer to the undermost roll, and gear wheels connecting said rolls to cause them to feed the stalks between them toward the side of the frame beyond which said bars project.

In testimony whereof I affix my signature, in the presence of two witnesses.

JOSEPH F. MAST.

Witnesses:
 S. C. LOBAUGH,
 J. M. CORY.